UNITED STATES PATENT OFFICE.

ANTON LEDERER, OF VIENNA, AUSTRIA-HUNGARY, ASSIGNOR TO WESTINGHOUSE LAMP COMPANY, A CORPORATION OF PENNSYLVANIA.

MANUFACTURE OF METALLIC FILAMENTS FOR ELECTRIC LAMPS.

1,116,450.  Specification of Letters Patent. Patented Nov. 10, 1914.

No Drawing.  Application filed November 11, 1910. Serial No. 591,815.

*To all whom it may concern:*

Be it known that I, ANTON LEDERER, a subject of the Emperor of Austria-Hungary, and a resident of Vienna, Austria-Hungary, have invented a new and useful Improvement Relating to the Manufacture of Metal Filaments for Electric Lamps, of which the following is a specification.

This invention relates to the manufacture of metal filaments for incandescent electric lamps and has for its object a method of purifying commercial filaments placed upon the market as finished filaments but which still contain sufficient carbon to be injurious to the satisfactory operation of the lamp in use.

A well-known method of producing metallic filaments for incandescent electric lamps is by mixing a refractory metal or its compounds with a carbonaceous binding material until a mass is obtained which is capable of being pressed through dies and so formed into filaments. The filaments thus prepared are then baked in a suitable environment at a temperature of about 1,000° C. whereupon the carbonaceous binding material is decomposed and a filament consisting of the refractory metal and carbon is formed. Such filaments are usually called "raw filaments" and before use the carbon must be removed. Various methods have been adopted for removing the carbon from such filaments, some of which methods are only partially successful so that many filaments are placed upon the market or lamps are manufactured containing filaments which still contain carbon.

By my method I am enabled to effect a thorough removal of the carbon and it is immaterial in what form the carbon is contained in the filaments, as by means of my process it is not only possible to decarbonize filaments which have been made by the so-called paste process but also filaments which have been produced by depositing a refractory metal upon a carbon core.

In carrying out the process the filaments are heated in an atmosphere of pure dry hydrogen and it is particularly important that the hydrogen should be carefully purified in order to remove all traces of oxidizing gases and moisture. The heating of the filaments can be effected either by passage through them of an electric current or by means of an external source of heat such as an electric resistance furnace. Preferably the latter method will be used because it is possible by this means to treat simultaneously a large number of filaments.

I claim as my invention:—

1. The method of removing carbon from metallic filamentary bodies containing only a small amount thereof, which consists in heating them in an atmosphere of carefully purified dry hydrogen.

2. The method of removing carbon from metallic filamentary bodies containing only a small amount thereof, which consists in heating them in an atmosphere of hydrogen which has been carefully purified so as to remove all traces of oxidizing gases and moisture.

3. The method of removing carbon from metallic filamentary bodies containing only a small amount thereof, which consists in heating them by means of an external source of heat in an atmosphere of pure dry hydrogen.

4. The method of removing carbon from filamentary bodies of tungsten containing only a small amount of said carbon, which consists in heating them in an atmosphere of pure dry hydrogen.

5. The method of removing carbon from filamentary bodies of tungsten containing only a small amount thereof, which consists in eliminating the said carbon as a hydrocarbon compound by heating the said bodies in an atmosphere of pure dry hydrogen.

In testimony whereof I have hereunto subscribed my name this 27th day of October, 1910.

ANTON LEDERER.

Witnesses:
ADA MARIA BERGER,
ADELAIDE FUNK.